United States Patent [19]

Pischinger

[11] Patent Number: 5,211,146
[45] Date of Patent: May 18, 1993

[54] INLET CONTROL MECHANISM FOR INTERNAL COMBUSTION ENGINE

[75] Inventor: Franz Pischinger, Aachen, Fed. Rep. of Germany

[73] Assignee: FEV Motorentechnik GmbH & Co. KG, Aachen, Fed. Rep. of Germany

[21] Appl. No.: 864,394

[22] Filed: Apr. 6, 1992

[30] Foreign Application Priority Data

Apr. 6, 1991 [DE] Fed. Rep. of Germany ....... 4111153

[51] Int. Cl.⁵ ............................................. F02B 75/02
[52] U.S. Cl. ................................. 123/316; 123/90.15; 123/90.17
[58] Field of Search ................. 123/90.16, 316, 90.15, 123/90.17, 90.18, 90.11

[56] References Cited

U.S. PATENT DOCUMENTS

| | | | |
|---|---|---|---|
| 1,885,796 | 11/1932 | Boulet | 123/90 |
| 2,057,354 | 10/1936 | Withers et al. | 123/90 |
| 2,682,260 | 6/1954 | Lantz | 123/90 |
| 4,455,543 | 6/1984 | Pischinger | 335/266 |
| 4,570,590 | 2/1986 | Kawai et al. | 123/90.16 |
| 4,580,533 | 4/1986 | Oda et al. | 123/90.16 |
| 4,651,684 | 3/1987 | Masuda et al. | 123/90.16 |
| 4,667,636 | 5/1987 | Oishi et al. | 123/90.16 |
| 4,700,684 | 10/1987 | Pischinger et al. | 123/90.16 |
| 4,703,734 | 11/1987 | Aoyama et al. | 123/432 |
| 4,759,321 | 7/1988 | Matsumoto et al. | 123/90.15 |

FOREIGN PATENT DOCUMENTS

| | | | |
|---|---|---|---|
| 0117318 | 7/1983 | Japan | 123/316 |
| 0046307 | 3/1984 | Japan | 123/90.16 |

Primary Examiner—E. Rollins Cross
Assistant Examiner—Erick Solis
Attorney, Agent, or Firm—Watson, Cole, Grindle & Watson

[57] ABSTRACT

For 4 cycle internal combustion engines with adjustable inlet control periods and individual suction pipe segments per cylinder or per inlet, at low speeds and high torque (high load up to full load) the combustion sequence is improved in that the opening start of the inlet valve is shifted in such a manner to a later instant following the top dead center of the piston that for a suitable suction pipe length the pressure wave generated while opening the inlet causes a recharging of the cylinder prior to closing the inlet.

15 Claims, 2 Drawing Sheets

INLET CONTROL MECHANISM FOR INTERNAL COMBUSTION ENGINE

BACKGROUND OF THE INVENTION

This invention relates to 4 cycle internal combustion engines with adjustable inlet control periods and individual suction pipe segments per cylinder or per inlet.

To obtain high output of such engines without special supercharging units, the objective is to realize as efficient an opening as possible of the inlet valve (large quantity per unit of time). To this end, the inlet valve is opened as early as possible, of course taking into consideration negative effects resulting from the valve overlapping with the closing of the outlet valve; and it is not closed until a maximum cylinder filling has been reached. Another measure to increase the cylinder charge is the use of one inlet line per cylinder, whose dimensions (length and diameter) are coordinated in such a manner that through reflection towards the end of closing the inlet valve overpressure is produced upstream of the inlet valve. The drawback with this arrangement is the required long length of the intake line, which frequently renders the installation difficult in motor vehicles and similar devices.

If such engines are operated over a wide speed range with high torque, they require at full load both at low and high speeds a good cylinder filling and a thermodynamically good combustion. A good filling can be obtained with timing elements with good flow properties, that is with low flow resistance. This applies in particular to the inlet valves. For example, 4 valve engines (2 inlet valves) with channels exhibiting good flow have in this respect at high speeds especially good characteristics. The low flow resistance results in an inflow without any large losses in pressure The cylinder filling is facilitated by the dynamic operations in the suction lines. Due to the reflecting operations during the short inlet periods at high speeds the short lines that are necessitated by the spatial pecularities in engines result in overpressure upstream of the cylinder, before the inlet valves close. In this manner the inflowing fresh charge quantity is enlarged. Simultaneously the high flow rates existing at high speeds ensure an adequately high level of turbulence in the cylinder, which remains largely preserved until the end of the compression also because of the short available time and leads to a thermodynamically good, fast combustion.

In the low speed range, on the other hand, engines have with the known method for inlet control for precisely inlet valves exhibiting good flow both a lower cylinder filling and an unfavorable combustion sequence. First of all, the poor filling is due to the fresh charge being pushed back in part into the intake system owing to the closing of the inlet designed for high speed, as a consequence of the control periods that are usually fixed (in degree crank angle). Second, at low speeds the oscillations in the suction pipe have a poor effect on the cylinder filling, since the wave travel times no longer fit the opening time of the inlet valve. Third, the cylinder charge is heated on the hot walls in the cylinder owing to the long dwell time. In addition, the low rate of inflow at low speed causes a low level of turbulence, which decreases even further as a consequence of the longer residence time until the start of combustion. The result is slow combustion with poor efficiency and increased tendency to knock. In total, the obtainable torque at low speeds is, therefore, unfavorable, a feature that has drawbacks especially for motor vehicle engines and renders tuning the drive difficult for low fuel consumption.

An attempt has already been made to counteract these drawbacks existing at low speeds. For example, suction pipes of variable length can be used, so that at low speed the effective dimension (e.g. length of suction pipe) is adapted to the low speed by changing over or other mechanical means. In so doing, the limited structural space in the motor vehicles often renders the housing of the necessary voluminous dimensions difficult. It is also possible, in particular with several inlet valves to reduce the inflow cross sections by turning off suction pipes acting in parallel, whereby the dynamics and the flow rate can be improved in connection with a length adjustment. The cost for this is relatively high; and the obtainable effects are limited.

Another possibility lies in the rotational adjustment of the inlet camshaft (at low speed counter to the direction of rotation), so that with the same opening duration an earlier closing of the inlet counteracts the return flow following the end of intake at starting piston stroke. Unfortunately, associated with this is an earlier opening of the inlet, resulting in a return flow of the exhaust gas into the inlet channel. This can have an unfavorable effect on the filling and knocking behavior. The requisite turbulence for a rapid knock-free combustion cannot be obtained with all of these measures, if simultaneously the filling loss at maximum output may not become too large.

It is possible with variable opening times of the valves to adjust the control periods to the requirements of an engine over the entire operating range. To date this procedure seeks to change the inlet closure under full load and to change the opening time under partial load. The latter measure serves to reduce the cylinder charge for load control under partial load. However, even with this measure a satisfactory solution to represent a high full load torque at low speeds for high power engines has not been possible to date.

SUMMARY OF THE INVENTION

The present invention is based on the problem of improving significantly for low speeds the filling and combustion of a 4 cycle engine under high load, in particular under full load, without having to dispense with a good performance at high speeds. In so doing, the drawbacks of the known measures are substantially avoided.

This is achieved according to the invention in that at low speeds and high torque (high load up to full load) in the range of 10° to 90° crank angle the inlet valve opens following the top dead center of the piston. In so doing, with the inlet valve closed during the downward stroke of the piston the pressure is reduced, first of all, in the cylinder, which causes a higher rate of inflow when the inlet valve is opened late. Thus, a strong underpressure wave is triggered in the inlet channel, which is reflected at the suction pipe entry as the overpressure wave and, when the suction pipe is suitably dimensioned, arrives on time upstream of the inlet valve prior to inlet cutoff so that a high filling of the cylinder is ensured.

The targeted high speeds of entry also cause the high turbulence of the cylinder charge which is required for a thermodynamically good, rapid combustion. Owing to the delayed inlet opening according to the invention, the inlet time is shortened so that the length dimensions of the suction pipes can be shorter for favorable recharging... In this manner, the conditions for dimensioning and/or changing over the suction system over a wide range of torque are improved; and a change-over to a modified suction pipe geometry can be even superfluous under some circumstances. So that the conditions for the charge cycle meet the requirements even at high speeds and over the entire range of torque, the point in time for opening the inlet is set, according to the invention, steplessly or in steps as a function of the speed so that with increasing speed the opening starts earlier. In such manner, the procedure adapts the inflow conditions for full load that are necessary for the high filling of the cylinder and for a thermodynamically good combustion to the respective speed requirements.

The process can be realized preferably with totally variable inlet valve setting devices. These setting devices (e.g. electromechanical ones according to the U.S. Pat. No. 4,455,543) enable continuous adjustment of the control time "inlet opens" and the opening duration to the speed in order to obtain favorable torque characteristics. In connection with 4 valve engines one of the two inlet valves can also be shut down at lower speeds with these totally variable setting devices, so that the still working valve can interact with a channel of smaller cross section and length adjusted for lower speeds. In this manner the process can be used especially well to obtain a wide range of speeds with full load filling. The filling can be significantly increased over the amount that was possible with the control times known to date. Especially favorable is the use of valve setting devices with speed-independent opening and the closing speed. Thus, at low speeds the opening pulse can be converted especially effectively into recharging towards the admission shutoff through delayed openings.

The described process is not limited to the application of totally variable setting devices. Even mechanical procedures such as the rotation of two adjacent cams acting on one valve can be used to set the control time "inlet opening". In addition, the inlet can be opened independently of the opening of the inlet valve by actuating a controller, situated in the vicinity of the inlet valve, in the inlet line.

DETAILED DESCRIPTION OF THE INVENTION

Figure 1:
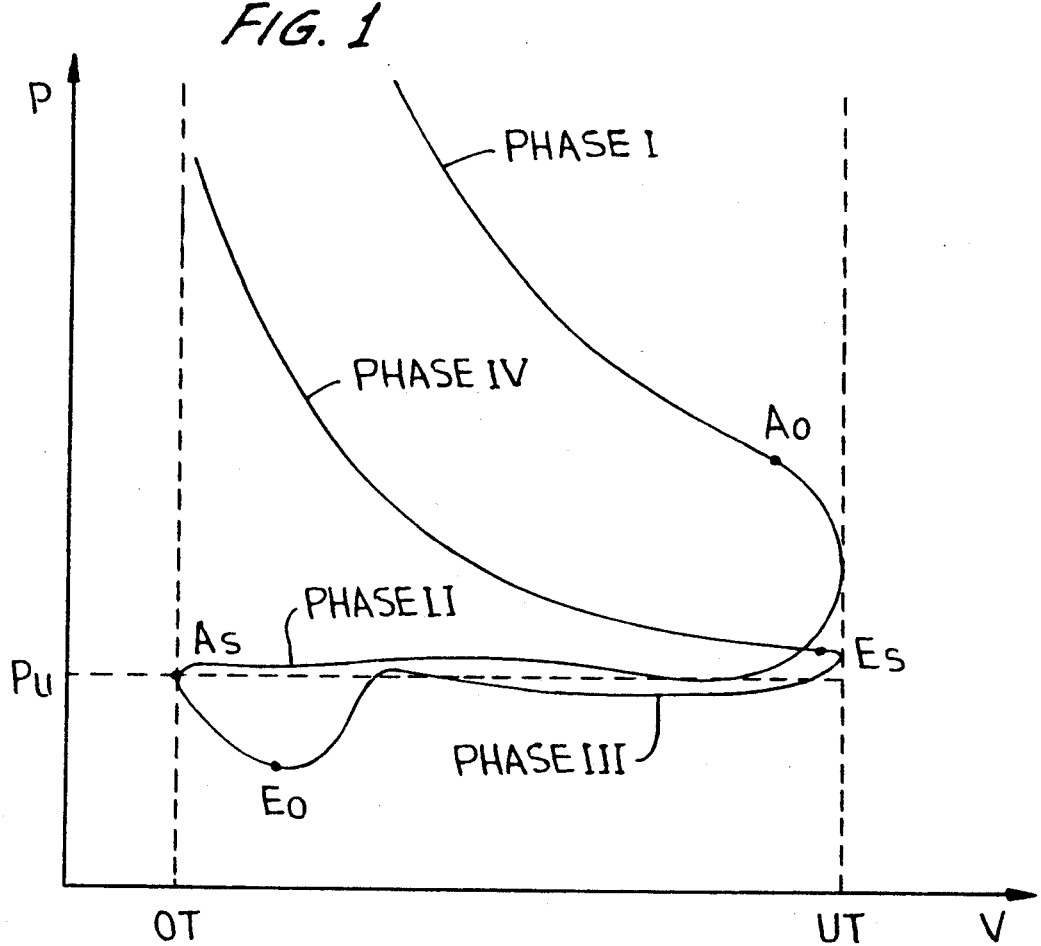
FIG. 1 is a diagram of the cylinder pressure as a function of the swept volume for one working cycle of a 4 cycle piston engine according to the invention.

FIG. 1 describes the cylinder pressure curve p as a function of the cylinder volume V for one working cycle of a 4 cycle piston engine. The designation UT (bottom dead center) characterizes the lowest position of the piston in the cylinder; OT (top dead center) is the highest position of the piston. Between these two positions shown with vertically dashed lines, one working cycle of the 4 cycle piston engine takes place as follows.

In the expansion phase called Phase I the piston is moved to the bottom dead center UT by means of the explosion pressure of the fuel/air mixture ignited beforehand. In the region of the bottom dead center UT—usually just before—the outlet valve is opened (Ao).

During Phase II, the socalled displacement phase, the piston moves from the bottom dead center to the top dead center and, in so doing, with the outlet valve open pushes the burned cylinder charge into the exhaust gas system. In the region of the top dead center OT the outlet valve is closed (As). According to the invention and at variance with the conventional method, the inlet valve is opened with delay during the subsequent downward movement of the piston (Eo), so that an underpressure is built up in the cylinder. When the inlet valve is opened, this underpressure is suddenly eliminated by the fresh mixture flowing in at high speed.

During the subsequent intake phase, Phase III, the piston draws fresh mixture through the opened inlet valve into the cylinder.

Simultaneously a strong underpressure wave generated by opening the inlet valve against the underpressure in the combustion chamber travels through the suction system and is reflected as an overpressure wave on the suction pipe entry. With suitable suction pipe dimensioning this overpressure wave reaches the inlet valve in due time before the closing of the inlet (Es) and therefore provides for a high filling of the cylinder by means of a recharging effect.

After the inlet valve has been closed, in Phase IV during the generated upward movement of the piston from the bottom dead center to the top dead center the previously drawn-in fresh mixture is compressed and ignited so that the described process is repeated.

Figure 2:
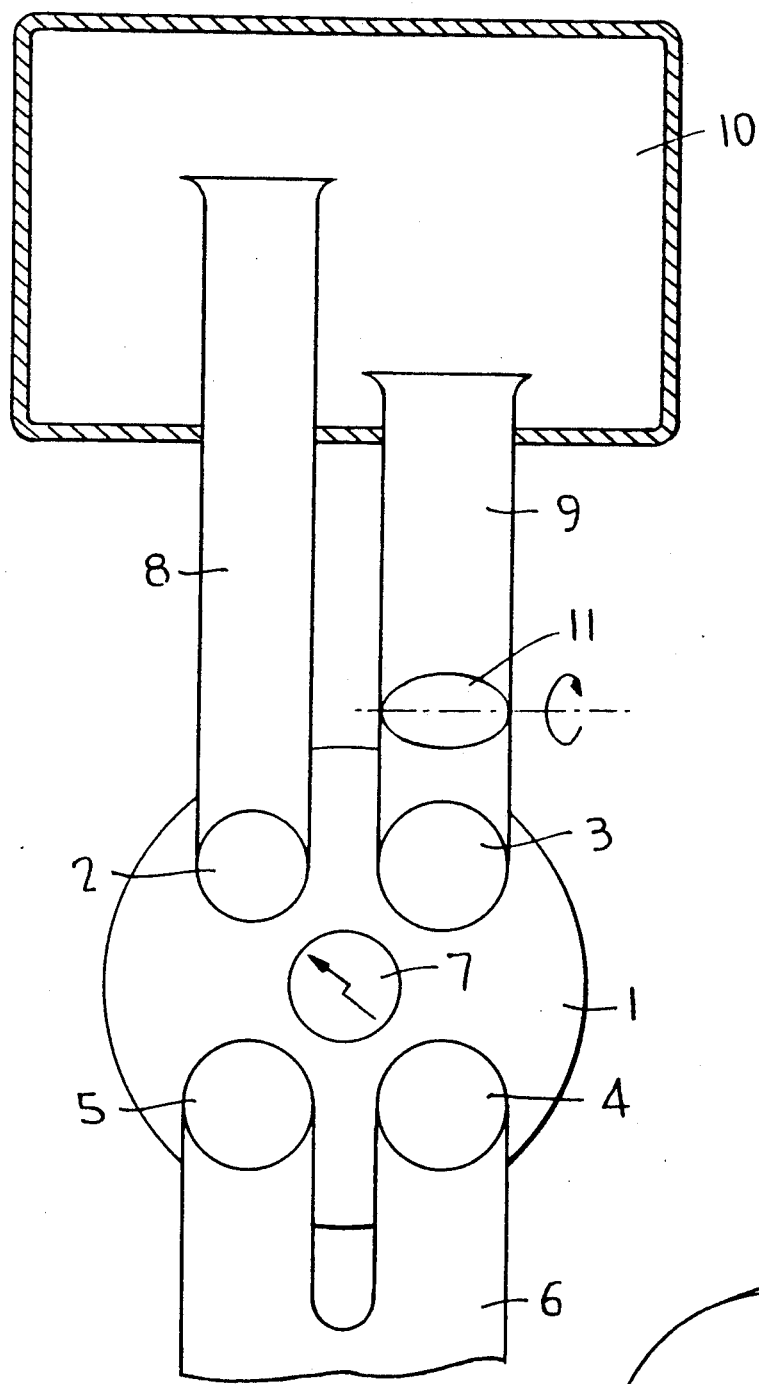
FIG. 2 is a schematic and simplified drawing of the cross section of one section of a 4 cycle piston engine with four valves per cylinder according to the invention.

FIG. 2 is a schematic drawing of a cross section of a section of a piston engine with four valves per cylinder. Shown is a cylinder 1 with two inlet valves 2 and 3 and two outlet valves 4 and 5. Furthermore, outlet channel 6 and spark Plug 7 can be seen. Separated inlet channels 8 and 9 with different cross sections and lengths terminate in the air intake plenum 10. Inlet channel 9 has a flap 11, by means of which the inlet channel 9 can be closed.

With variable setting devices one of the two inlet valves can be shut down at lower speeds, so that the still working valve can interact with a channel of smaller cross section and length dimensioned for lower speeds.

At low speeds and high torque (high load up to full load) the valve control periods are changed in such a manner that at the start of opening the inlet is shifted to a later point of time after the top dead center, and in particular in such a manner that with a suitable suction pipe length the pressure wave initiated while opening the inlet causes a recharging of the cylinder prior to the closing of the inlet. The opening of the inlet starts in a range of 10°–90° crank angle, preferably 20°–60° crank angle, after the top dead center.

The opening of the inlet can be set late continuously or in steps. It can also be advantageous that simultaneously with the late setting of the inlet opening the closing of the inlet is set stepwise or continuously after "early".

The control periods can be set by an electromagnetically controlled valve setting device or by mechanical rotation of cam contours working together on a ram. The control times can also be set by a hydraulic valve control mechanism.

Another advantageous possibility lies in the fact that the inlet is opened independently of the opening of an inlet valve 2 or 3 by opening a controller 11, situated in the vicinity of the inlet valve 2 or 3, in the inlet line 9.

Another advantageous possibility lies in the fact that of two inlet valves 2, 3 only one is set and the other remains closed, or that of two inlet valves 2, 3 only one is set and the inlet channel to the other is closed by means of the flap 11 in the vicinity of the inlet valve.

The inlet channel related to the adjusted valve can be designed separately and longer than that related to the closed inlet.

Finally, it can be advantageous if during the transition from the high load to the lower load (partial load) the late adjustment of the inlet opening is reversed continuously.

Figure 3:
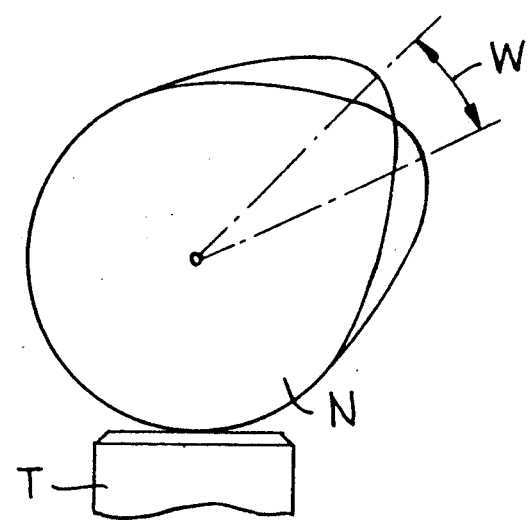
FIG. 3 shows two cams of a camshaft usable for the invention.

FIG. 3 shows a part of a camshaft, where two adjacent cams N, both of which act on the tappet T, or rocker arm or push arm, to actuate an inlet valve, can be rotated by an angle W against one another. By using valve setting devices of this kind, the control times "open inlet" can be adjusted in a suitable manner by rotating two adjacent cams.

Figure 4:
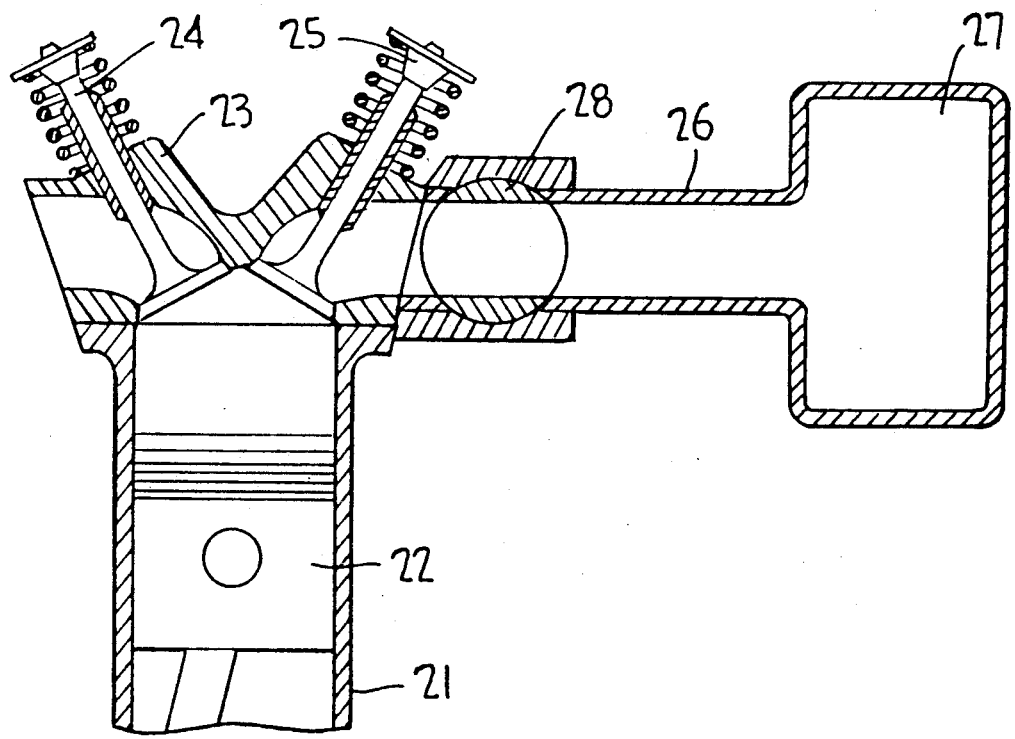
FIG. 4 is a simplified longitudinal view of a cylinder unit of a 4 cycle piston engine exemplifying the invention.

FIG. 4 is a simplified and schematic longitudinal view of an internal combustion engine. Cylinder head 23 with outlet valve 24 and inlet valve 25 are mounted on the crank housing 21 with piston 22. The inlet valve has an inlet channel 26, which terminates in an air intake plenum 27. The inlet channel 26 has an additional controller 28 to control "open inlet" irrespective of the opening of the inlet valve. In so doing, it is favorable if the controller 28 is located in the vicinity of the inlet valve 25.

What is claimed is:

1. Process for controlling the inlet valves of a 4 cycle internal combustion engine having a crankshaft and having adjustable inlet control periods and individual suction pipe segments per cylinder or per inlet, comprising, at low speeds and changing the valve control times for shifting the opening start of the inlet valve into a later time interval following the top dead center of the piston that for a suitable suction pipe length the pressure wave generated while opening the inlet causes a recharging of the cylinder prior to closing the inlet.

2. Process, as claimed in claim 1, wherein the opening of the inlet starts relative to crankshaft rotation in a range of 10°-90° crank angle after the top dead center.

3. Process, as claimed in claim 1, wherein the opening of the inlet starts relative to crankshaft rotation in a range of 20°-60° crank angle, after the top dead center.

4. Process, as claimed in claim 1, wherein with increasing load in the low speed range with decreasing engine output the opening start of the inlet is shifted increasingly to delayed points in time, relative to crankshaft rotation measured in degrees crank angle, after the top dead center.

5. Process, as claimed in claim 4, wherein the delayed adjustment of the opening of the inlet is continuous.

6. Process, as claimed in claim 4, wherein the delayed adjustment of the opening of the inlet is in steps.

7. Process, as claimed in claim 1, wherein simultaneously with the delayed adjustment of the inlet opening the closing of the inlet is set stepwise or continuously in a premature adjustment.

8. Process, as claimed in claim 1, wherein the control times are set by an electromagnetically controlled valve setting device.

9. Process, as claimed in claim 1, wherein the control times are set by mechanical rotation of cam contours working together on a tappet.

10. Process, as claimed in claim 1, wherein the control times are set by a hydraulic valve control mechanism.

11. Process, as claimed in claim 1, wherein the inlet opening is independent of the opening of an inlet valve by opening a controller, situated in the vicinity of the inlet valve, in the inlet line.

12. Process, as claimed in claim 1, wherein of two inlet valves only one is set and the other remains closed.

13. Process, as claimed in claim 1, wherein of two inlet valves only one is set and the inlet channel to the other is closed by means of a flap in the vicinity of the inlet valve.

14. Process, as claimed in claim 12 or 13, wherein the inlet channel related to the adjusted inlet valve is designed separately and longer than that related to the closed inlet.

15. Process, as claimed in claim 1, wherein during the transition from the high load to the lower load the delayed adjustment of the inlet opening is reversed continuously.

* * * * *